W. Park,

Water Meter.

No. 111,143. Patented Jan. 24, 1871.

Witnesses—
A. Y. Park
Solomon Lucas

Inventor—
Webster Park

WEBSTER PARK, OF NORWICH, CONNECTICUT.

Letters Patent No. 111,143, dated January 24, 1871.

IMPROVEMENT IN WATER-METERS.

The Schedule referred to in these Letters Patent and making part of the same.

I, WEBSTER PARK, of Norwich, in the county of New London and State of Connecticut, have invented an Improved Water-Meter, of which the following is a specification.

The nature of my invention consists in ascertaining the quantity of water flowing through the meter, by a combination of mechanical devices for moving the indicator in conformity with both the velocity and the size of a constantly varying stream. For this purpose the water on entering the meter is passed through a narrow orifice or gate, so constructed that it will close automatically when no water is running, and will be opened by the water sufficient to allow its discharge.

In front of this self-closing gate some suitable device should be placed for ascertaining the velocity of the stream issuing through the orifice.

While I would not wish to confine my invention to any particular device, I have found, by experiment, that an ordinary plain circular wheel with small radial floats, as shown in the drawing, will be revolved in the water by the stream issuing from the gate with sufficient accuracy.

This wheel gives motion to an ordinary plain toothwheel, the radius of which should be at least equal to the height of the open gate.

Upon the side of this tooth-wheel is adjusted a small friction-wheel, which, while it slides freely upon also rotates its shaft, placed at right angles with the axis of the tooth-wheel, its shaft being longer than the radius of the tooth-wheel, so that it may turn in suitable bearings, and having a worm or pinion, so as to give motion to the ordinary registering mechanism used in all meters.

This friction-wheel is yoked to the gate, and so adjusted that when the gate is closed the wheel will stand upon the center of the tooth-wheel, but when the gate is opened the friction-wheel will be removed from the center of the tooth-wheel the exact distance the gate is opened, so that it will revolve upon the periphery of a circle on the side of the revolving toothwheel, the radius of which circle is exactly equal to the distance the gate is open.

The principle of my invention being that the quantity of water discharged through an orifice of a given width with a given velocity, will vary directly as the height of the orifice, and that the velocity of the friction-wheel and its shaft will vary directly as the radius of that portion of the tooth-wheel which gives motion to it, therefore, this radius and the height of the open gate being kept quite equal by the yoke, the speed of the registering mechanism will be commensurate to the quantity of water discharged through the gate at any height, while the velocity of the water through the gate continues the same; but when its velocity varies the speed of the float-wheel also correspondingly varies, and, independent of the movement of the gate, directly varies the speed of the registering mechanism according to the velocity of the water, so that by a combination of these two devices my invention becomes a sufficiently accurate indicator of the quantity of water discharged under all varying heads and through any-sized orifice.

The object of my invention being to construct a small and cheap water-meter, capable of indicating a very small discharge by concentrating the water into a small stream impinging upon the floats, while at the same time it will permit the discharge of a large stream, the size shown in the drawing being sufficient to indicate the water discharged from an ordinary faucet.

When discharging a large stream, it is somewhat similar in its operation to the well-known proportional meters, as nearly all the water flows through the upper part of the gate without coming in contact with any of the working parts of the meter.

In the accompanying drawing—

Figure 1:
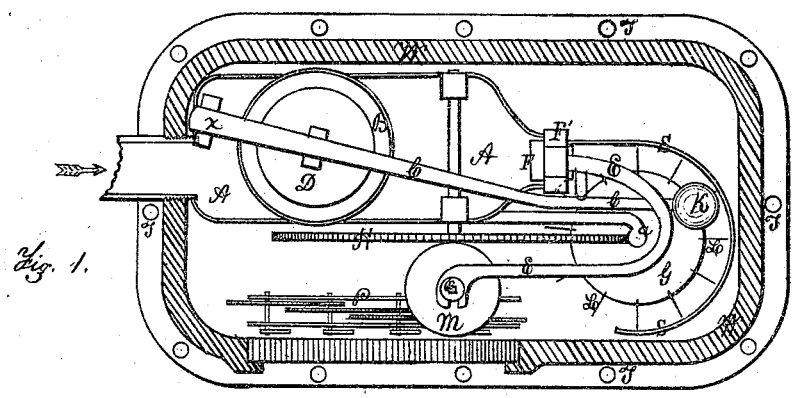
Figure 1 is a top view, partly in section, of a water-meter embodying my improvement.
Figure 2:
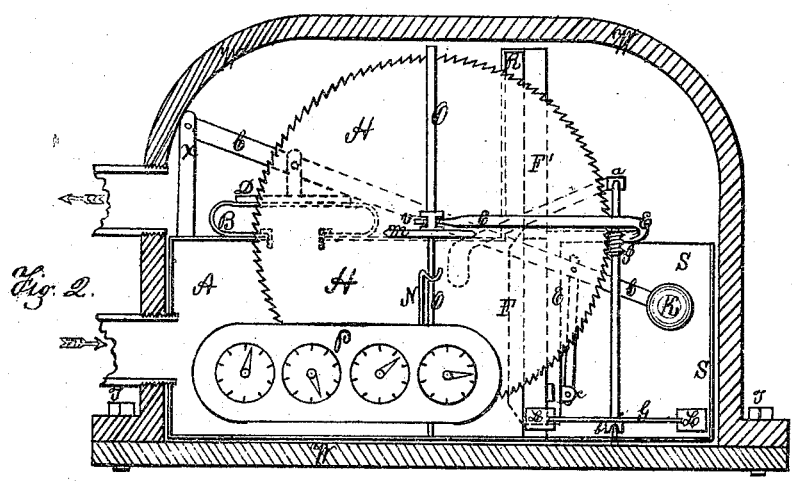
Figure 2 is a side view of the same, the arrows showing the supply and discharge-pipes through the shell of the meter, T T being the screws for securing the two parts of the shell W together.
Figures 3, 4, 5, 6:
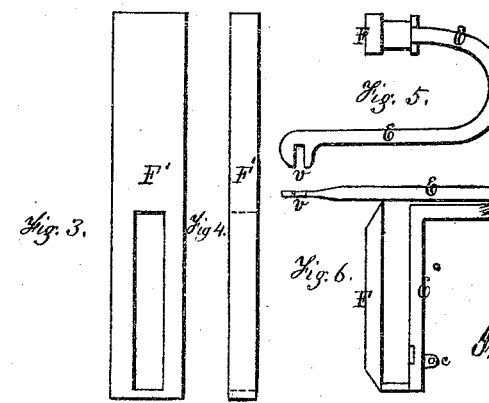

Figures 3 and 4 are front and side views of the gate-seat or frame F', showing the form of the orifice; and Figures 5 and 6 are top and side views of the gate F, in the same positions as in figs. 1 and 2, respectively, showing the construction of the rod or yoke E, by which the gate F is connected to the friction-wheel M, c being the attachment by which the lever C raises the gate F, as hereinafter described.

A is a chamber, into which the water is received.

F is a plain sliding gate, which should be fitted accurately to its seat and adjusted to slide up into the chamber R, so as to uncover the whole device.

B is a flexible cap of rubber, leather, or other proper material, adjusted over an opening into the chamber A.

D rests upon the cap B, and by means of the lever C, which is pivoted at X and connected to the rod E attached to the bottom of the outer side of the gate F, when the water flows into the chamber A it easily presses up the cap B and raises the gate F enough to permit its discharge, K being a small weight sufficient to close the gate.

G is the wheel, the floats L of which, when it revolves, come in front of the bottom of the orifice, so that when the smallest stream is running it will impinge upon their center.

S partly surrounds the wheel G, so as to turn the stream against the floats, and is of equal height with the gate F, so as to make the discharge of water from all parts of the orifice uniform.

I is a worm, which moves the tooth-wheel H, whose radius equals the height of the gate F.

M is the friction-wheel, which slides upon the upper square part of the shaft O, and by means of the rod E is yoked to the gate F so as to rise and fall simultaneously with it.

N is a slight spring, to press the wheel M upon the side of the wheel H.

P is the ordinary register, which receives its motion from the lower end of the shaft O, the dials of which may be seen through a glass in the upper part of the shell.

Having described my apparatus, I would not confine my invention strictly to this mode of construction; but

I claim as my invention—

1. The combination and arrangement of the self-closing gate F with the flexible cap B, for the purpose of giving a positive and reliable motion to the wheel of a water-meter, substantially as herein described.

2. The combination and arrangement of the wheels H M, yoke E, and gate F, for the purpose of varying the movement of the indicators, according to the size of the opening, substantially as herein set forth.

3. The combination and arrangement of the self-closing gate F and cap B with the water-wheel G L, and with the wheels H M and yoke E, for the purpose of moving the indicators by both the velocity and the depth of the stream, and hence according to the quantity of water flowing through the meter, substantially as and for the purpose herein described.

WEBSTER PARK.

Witnesses:
ALBERT F. PARK,
WILLIAM S. LAIGHTON.